United States Patent [19]

Baxi

[11] Patent Number: 5,112,563
[45] Date of Patent: * May 12, 1992

[54] PROCESS OF INJECTION MOLDING WITH PRESSURIZED GAS ASSIST

[75] Inventor: Indra R. Baxi, Troy, Mich.

[73] Assignee: Nitrojection Corporation, Middlefield, Ohio

[ * ] Notice: The portion of the term of this patent subsequent to Jun. 19, 2007 has been disclaimed.

[21] Appl. No.: 497,525

[22] Filed: Mar. 22, 1990

Related U.S. Application Data

[63] Continuation of Ser. No. 121,908, Nov. 17, 1987, Pat. No. 4,935,191, which is a continuation-in-part of Ser. No. 919,670, Oct. 16, 1986, abandoned, which is a continuation-in-part of Ser. No. 864,892, May 19, 1986, abandoned.

[51] Int. Cl.$^5$ .................. B29C 45/00; B29C 45/34; B29D 22/00
[52] U.S. Cl. .................. 264/572; 264/328.8; 264/328.12; 425/812
[58] Field of Search .................. 264/40.3, 85, 328.1, 264/328.8, 328.12, 328.13, 500, 572; 425/812

[56] References Cited

U.S. PATENT DOCUMENTS

| | | | |
|---|---|---|---|
| 2,940,123 | 6/1960 | Beck et al. | 425/546 |
| 3,184,524 | 5/1965 | Whiteford | 264/550 |
| 4,106,887 | 8/1978 | Yasuike et al. | 425/549 |
| 4,855,094 | 8/1989 | Hendry | 264/40.3 |

FOREIGN PATENT DOCUMENTS

| | | |
|---|---|---|
| 1929343 | 6/1969 | Fed. Rep. of Germany . |
| 2256021 | 7/1975 | France . |
| 57-14968 | 3/1982 | Japan .................. 264/572 |
| 2139548A | 11/1984 | United Kingdom . |

OTHER PUBLICATIONS

"The Best of Two Worlds in Plastic Processing", *Machine Design*, Dec. 9, 1962, Donald R. Dreger, Staff Editor.

*Primary Examiner*—Leo B. Tentoni
*Attorney, Agent, or Firm*—Fay, Sharpe, Beall, Fagan, Minnich & McKee

[57] ABSTRACT

A process for producing an injection molded product includes introducing a stream of plastic material into a mold space at a first pressure. A quantity of gas is stored in a storage chamber at a second pressure which is at least as high as the first pressure. The gas is introduced into the molten stream of plastic material immediately after the molten material has passed the position at which the gas is introduced thereby forming a gas cavity in the molten material. The gas exerts pressure on the surrounding plastic material to urge the material toward the surfaces of the mold space. As the feeding of the plastic material into the mold space continues, the injection of the gas is also continued. The supply of molten material is terminated when the surfaces of the mold space are completely covered by the molten material. A pressure is held within the gas cavity as the plastic material cools. Subsequently, the pressure is released to bring the mold space to ambient pressure. Then the mold is opened to remove the hollow shaped article. An apparatus for producing an injection molded product is also disclosed.

18 Claims, 1 Drawing Sheet

PROCESS OF INJECTION MOLDING WITH PRESSURIZED GAS ASSIST

The instant application is a continuation of patent application Ser. No. 121,908 filed on Nov. 17, 1987 and now U.S. Pat. No. 4,935,191. That application is a continuation-in-part of application Ser. No. 919,670 filed on Oct. 16, 1986 and now abandoned. That application is, in turn, a continuation-in-part of application Ser. No. 864,892 filed on May 19, 1986 which is abandoned.

BACKGROUND OF THE INVENTION

This invention generally pertains to injection molding. More specifically, the present invention relates to a process and apparatus for injection molding under a high pressure and moldings produced thereby.

The invention is particularly applicable to the injection of a gas under high pressure into a molten plastic stream as it enters a mold sprue and a mold space. However, it will be appreciated by those skilled in the art that the invention has broader applications and may also be adapted for use in many other injection molding environments.

It has become known that it is advantageous to urge the molten plastic material in an injection mold outwardly into contact with the mold surfaces by exerting pressure on the molten plastic. This aids the external surface of the plastic material in assuming the precise shape dictated by the mold surfaces. The pressure also assists the filling of the mold space with molten plastic even if the space is elongated or narrow and is normally difficult to fill. Such pressure can be applied by a fluid which is injected into the plastic material in the mold space. This is advantageous since the molded part produced utilizes less plastic material and is lighter than if the part were solid plastic.

Heretofore, conventional injection molding apparatuses have attempted to simultaneously inject a pressurized fluid and a molten plastic material into a mold cavity. Difficulties have, however, been experienced when the plastic needs to be injected at a high pressure since then a high pressure fluid (preferably gas at 4,000 to 15,000 psi) is also required. Conventional injection molding apparatuses utilize pump arrangements, such as a piston and cylinder pump, for pressurizing the gas when its injection into the molten stream of plastic material is called for. Unfortunately, the response time of a conventional piston and cylinder arrangement for pressurizing the gas to a suitably high pressure is approximately two to three seconds. Usually, however, the injection molding process itself is completed in these two to three seconds so that by the time the piston and cylinder arrangement has pressurized the gas to an adequate pressure to enter the mold space (for example, 9,000 psi) the injection molding of the molten plastic is completed. At this point, the gas will explode into the mold space and pressurize the plastic part that has been molded and move toward the surfaces of the mold cavity whatever molten plastic remains therein.

It should be noted that gas at high pressure, in the range of generally 4,000 to 15,000 psi, is unavailable from pressurized cylinders or the like that are commercially available. Although it is true that a 6,000 psi gas cylinder has now become available in certain areas, generally only gas cylinders pressurized at 2,500 psi are available. Thus gas from a conventional supply source needs to be pressurized before it can be utilized in an injection molding process. If such pressurization is not done before the injection molding process begins, the gas will generally only be adequately pressurized to its injection pressure after the molten plastic has already been injected.

To take one example, if a mold space is 90% full of molten and partially solidified plastic, and if there are a lot of bosses, ridges and ribs in the part to be molded then, before the pressurized gas enters the mold cavity, there will be numerous bad sink marks in the molded product. When the pressurized gas is injected after the injection of the molten plastic, the gas will urge the plastic outwardly and pushed the sink marks out against the surfaces of the mold space. This, however, causes shadow marks on the plastic product. Such shadow marks are very evident and are unacceptable for a class A finish. Moreover, gas entering the mold space after the plastic material has essentially stopped flowing will push the plastic more strongly in its thinner zones than in its thicker zones, as would be expected. In other words, the gas will drive the plastic somewhat sideways as well as outwardly. Additionally, the extremities of a plastic product will still get sink marks.

If, on the other hand, the product is not full of ribs, ridges, and bosses, then, when the plastic originally stops flowing, there will be a nonfilled area in the mold space. When the gas enters the mold space, it will push whatever molten plastic remains into the nonfilled areas so that the plastic will coat all the surfaces of the mold space. However, a clear line of demarcation will be evident on the surface of the product to show where the gas has compelled the plastic to flow again after it had initially stopped. This, again, is unacceptable for a class A finish. In both of the above instances post molding treatment, such as painting, is called for and this, obviously, adds to the expense of the molded part.

Accordingly, it has been considered desirable to develop a new and improved method for injection molding and an apparatus therefor and moldings produced thereby which would overcome the foregoing difficulties and others while providing better and more advantageous overall results.

BRIEF SUMMARY OF THE INVENTION

In accordance with the present invention, a new and improved process is provided for producing an injection molded product.

More particularly in accordance with the invention, a molten stream of a plastic material is introduced into a mold space at a first pressure. A quantity of gas is stored in a storage chamber at a second pressure which is at least as high as the first pressure. Gas is introduced into the molten stream of plastic material immediately after the molten material has passed the position at which the gas is introduced thereby forming a gas cavity in the molten material. The gas exerts a pressure on the surrounding plastic material to urge the material toward the surfaces of the mold space. Plastic material continues to be fed into the mold space and simultaneously gas is continuously injected into the gas cavity. The supply of molten material is terminated when the surfaces of the mold space are completely covered by molten material. Subsequently, the pressure within the gas cavity is maintained as the plastic material cools.

In accordance with another aspect of the invention, the gas is introduced at a pressure approximately between 2,000 psi and 15,000 psi. Preferably, the gas is an inert gas such as nitrogen.

In accordance with still another aspect of the invention, the process further comprises the step of venting the gas from the gas cavity. Preferably, the step of venting includes the step of controlling the rate of venting. Preferably, the gas is vented through a passage in a nozzle. Additionally, the steps of introducing gas and continuing to inject gas preferably takes place through the passage in the nozzle.

In accordance with yet another aspect of the invention, the process further comprises the step of replenishing the gas in the storage chamber. The step of replenishing comprises the subsidiary steps of introducing the gas at a low pressure into a pump and increasing the pressure of the gas by the pump until the pressure equals the second pressure. The gas is then introduced at the second pressure into the storage chamber.

In accordance with another aspect of the invention, the quantity of gas that is introduced into the mold space is not directly measured but only the pressure of the gas is controlled.

In accordance with a further aspect of the invention, an apparatus is disclosed for producing an injection molded product made of plastic material.

More particularly in accordance with this aspect of the invention, the apparatus comprises a means for introducing a molten plastic material into a mold space at a first pressure. A gas supply source is provided along with a gas pressurization means for pressurizing gas to a second pressure which is at least as great as the first pressure. A storage chamber is provided for storing gas at the second pressure so that the gas is immediately available for use. Means are provided for initiating gas flow from the storage chamber at the second pressure immediately after the molten plastic has passed the position at which the gas is introduced. A means is provided for maintaining a pressure on the molten plastic material against the surfaces of the mold space as the plastic cools and until it can sustain the form dictated by the mold.

In accordance with another aspect of the invention, the apparatus further comprises a means for continuously feeding gas at the second pressure into the mold space as long as the molten plastic is fed into the mold space.

In accordance with a further aspect of the invention, a means for venting the gas from the gas cavity is provided to allow the mold space to reach atmospheric pressure. Preferably, the means for venting comprises a nozzle, a bore extending through the nozzle, a conduit which is in fluid communication with the nozzle bore, and a valve for controlling fluid flow through the conduit.

A still further aspect of the invention includes an injection molded part which is formed by the process recited above.

One advantage of the present invention is the provision of a new injection molding method which introduces a gas into a molten stream of plastic material while the stream is still flowing.

Another advantage of the present invention is the provision of a process in which the gas is introduced into the molten stream of plastic material immediately after the stream has passed the position at which the gas is introduced to form the gas cavity in the molten material as quickly as possible.

Still another advantage of the present invention is the provision of a process and apparatus in which the gas is continuously fed or injected into the mold space as long as the molten stream of plastic material is introduced into the mold space thus ensuring that the plastic and gas are uniformly injected into the mold space and that a gas injection channel of a substantially constant diameter is formed in the injection molded part. This ensures that the gas will act to urge the molten plastic to contact all the mold space surfaces with approximately the same amount of force.

Yet another advantage of the present invention is the provision of an injection molding process and apparatus which can be used to mold parts from hard plastics, such as acrylics, polycarbonates and rigid PVC which may need to be injection molded at pressures of around 9,000 to 15,000 psi.

Yet still another advantage of the present invention is the provision of an apparatus which enables pressurized gas to be instantaneously available for an injection molding process.

A further advantage of the present invention is the provision of an apparatus in which the amount of gas flowing into a gas cavity does not need to be measured. In other words, the apparatus and process of the present invention is more forgiving and is not as difficult to run as conventional processes since it makes no difference in the process whether the volume of gas that is injected into the mold space is somewhat larger or smaller than what was otherwise desired.

A yet further advantage of the present invention is the provision of a means for venting the gas from the mold space without having to separate the nozzle from the mold space.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof and wherein.

DETAILED DESCRIPTION OF THE PREFERRED AND ALTERNATE EMBODIMENTS

Figure 1:
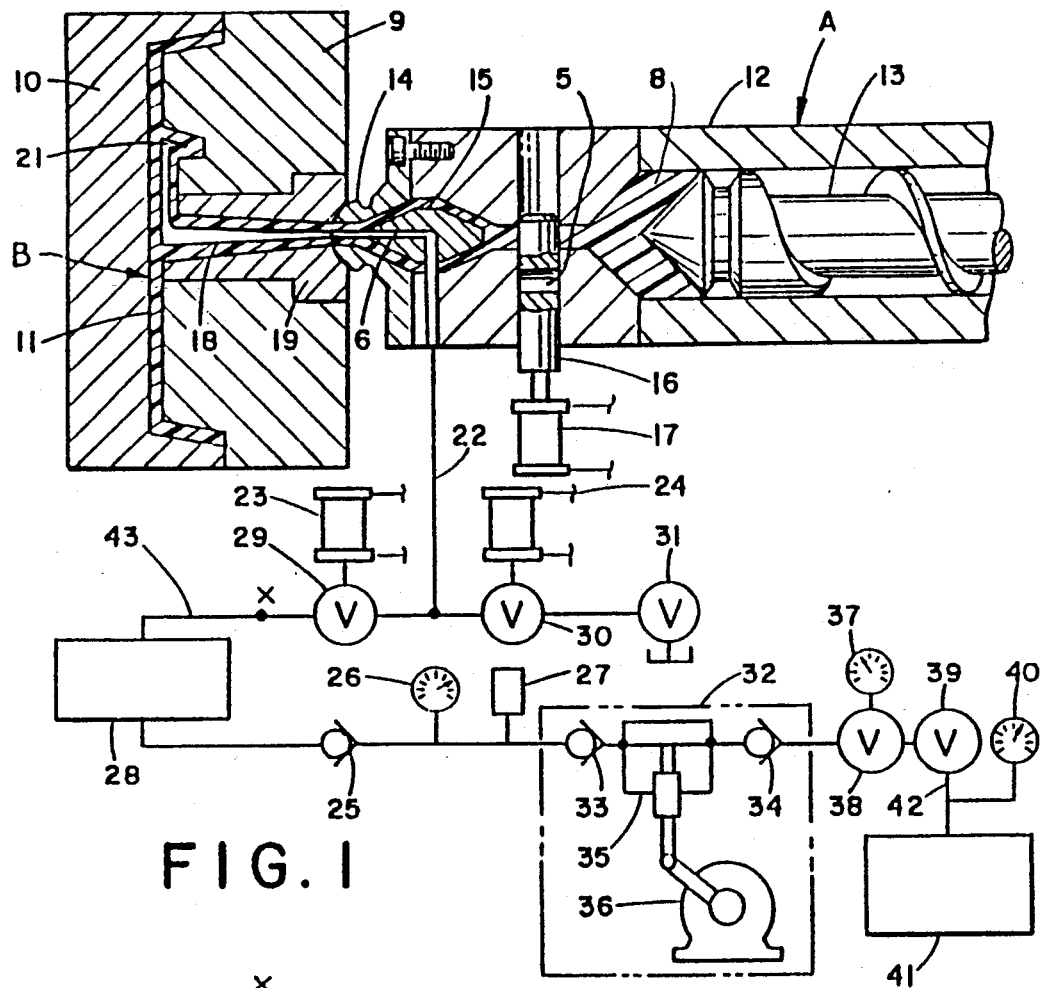
FIG. 1 is a side elevational view in cross section of a mold and a screw ram of an injection molding press incorporating the apparatus for pressurizing gas according to the present invention, the apparatus being shown in schematic form; and, FIG. 2 is a schematic illustration of an alternative apparatus for pressurizing gas according to the present invention that is usable with the mold of FIG. 1.

Referring now to the drawings, wherein the showings are for purposes of illustrating preferred and alternate embodiments of the invention only and not for purposes of limiting same, FIG. 1 shows the subject new gas supply system for an injection molding apparatus A. While the system is primarily designed for and will hereinafter be described in connection with injecting a gas at a mold space sprue, it will be appreciated that the overall inventive concept involved could be adapted to fluids injected at other points in the mold space as well.

To practice the invention, an apparatus A is provided which injects molten plastic under pressure into a mold space 11. Under high pressure, a gas is introduced to push, but not pack, the molten plastic into the mold space 11. The resultant molded part has a smooth outer surface with a minimal amount of sink marks such that the outer surface is acceptable as a class A finish. An injection molding press has a pair of cooperating mold parts 9 and 10 which define the mold space 11. Also, a housing 12 contains a hydraulic screw ram 13 for injecting a molten plastic 8 into the mold space 11. The screw ram has a nozzle 14 and a feed chamber 15. The heated and molten plastic material enters a sprue 18 from the nozzle 14 in the feed chamber 15 and flows into the mold space 11.

FIG. 1 also shows the pressurized gas supply system that is used to inject gas into the molten plastic at the mouth of the mold sprue 18 in a mold sprue bushing 19. The gas supply system incorporates a gas supply tank on cylinder 41, a high pressure gas pump assembly 32 and a high pressure gas storage tank 28. A control valve 29 is a high pressure gas directional valve to nozzle 14 and connects the nozzle to the gas storage tank 28 through a gas line 22. A check valve 25 between the chamber 28 and a gas pump assembly 32 prevents gas from flowing back to the pump assembly.

Prior to the start of a molding cycle, inert gas, such as nitrogen or the like, is stored in the high pressure gas storage tank 28. This is accomplished by activating a gas compressor pump 35 of the gas pump assembly 32. The pump 35 draws gas from a gas supply cylinder 41 through a suction passageway 42 to a suction side of the pump. If desired, suitable check valves 33 and 34 can be positioned in the suction passageway 42 on either side of the compressor pump 35 to prevent any reverse flow of pressurized gas. A suitable motor 36 can be utilized to power the pump 35. A pressure gauge 37 and a pressure reducing valve 38 together with a control valve 39 provide control of gas pressure entering the suction passageway 42 of the pump 35. A pressure gauge 40 can be provided in suction passageway 42 adjacent the gas supply cylinder 41 for measuring the pressure of the gas in the gas supply cylinder 41.

Gas is then pumped into tank 28 through the check valve 25 until the pressure setting on a pressure switch 27 is activated by reaching a predetermined gas pressure. This pressure is preferably in the range of 4,000 to 15,000 psi and is indicated on a pressure gauge 26. At the desired pressure setting, the pump 35 is shut off by means of pressure switch 27. The gas pressure setting on pressure switch 27 is dependent upon the type of plastic that will be injection molded. For example, with soft plastics, such as polyethylene, a lower pressure setting is all that is required. On the other hand, for viscous plastics, such as acrylic, polycarbonate, rigid PVC or acrylonitrile and the like, a higher pressure setting is necessary on the pressure switch 27 since these plastics are injected at a higher pressure into the mold space 11. The pressure needs to be adjusted for each type of plastic, i.e., a higher setting for acrylonitrile and a lower setting for polyethylene. If the pressure switch is set too high for a product such as polyethylene then the gas at this high pressure will blow clear out of the plastic rather than producing a gas bubble within the plastic.

At the instant that the pump 35 is shut off, the check valve 25 closes thereby holding high pressure gas between the two-way gas valve 29 and the check valve 25. The valve 29 is preferably a two-way directional air valve in which an air cylinder 23 is activated to open and close the valve 29.

When the high pressure gas storage tank 28 is fully charged at the desired pressure and the solenoid controlled two-way directional air valves 29 and 30 are in the closed position, the molding cycle is ready to begin.

To initiate the molding cycle, a conventional mold press clamping unit (not shown) is closed to hold the mold halves 9 and 10 under pressure. The nozzle shut off valve 16 is then opened by hydraulic cylinder actuator 17 by activating the valve upwardly so that an aperture 5 therein is aligned with the openings in the housing 12. At this point, the screw ram 13 is activated and when it moves forward it injects molten plastic material 8 into the mold space 11.

After a time delay just sufficient to permit the molten plastic to fill the sprue 18 by the forward movement of the screw ram 13, the valve 29 is opened by air cylinder 23. Opening the valve 29 instantaneously allows high pressure gas from storage chamber 28 to flow through gas line 22 and into gas inlet passage 6 located in the center of nozzle 14. The gas passage 6 extends to the outlet of the nozzle 14 to permit gas to be fed into the mouth of the sprue 18 and enter the molten plastic stream while the plastic injection molding process continues.

Again, it is noted that the plastic flows fairly readily itself and the desired amount of plastic material for the mold space is usually injected in approximately two to three seconds. Thus, it is imperative that a high pressure fluid, preferably gas be immediately available once the molten plastic stream enters the sprue 18. As a relative matter, the gas, once it begins to flow, will flow faster than the molten plastic and thus the gas pressure pushes the molten plastic into the mold space 11 forming an internal cavity 21 within the molded part. The rate of gas flow through the gas inlet passage 6 is not controlled and will vary during the molding cycle. The pressure of the gas in the storage chamber 28 is, however, controlled.

In other words, if the pressure in the storage chamber 28 becomes lower than the pressure setting on the pressure switch 27, as will happen once enough gas flows through the inlet passage 6, the pump 35 will start to build gas pressure up to the required amount in the storage tank 28 and thus sustain the pressure of the gas flowing into the molding hollow section to form an internal cavity 21 from the gas inlet passage 6.

It should be noted, however, that the gas pressure in the storage tank 28 need not be recharged from ambient pressure but only the pressure drop in the gas in the storage tank 28 needs to be made up. The pump 35 is preferably of the type that can generate small amounts of highly pressurized gas quickly enough to make up for the pressure drop in the tank 28 during the injection molding cycle so as to substantially maintain the storage tank at the desired pressure. The gas is preferably continuously injected into the mold space. This is advantageous since the plastic and the gas can thus both be uniformly injected into the mold space and a gas channel of a substantially constant diameter can be formed within the molded part. This ensures that the gas will act to urge the molten plastic to contact all the mold surfaces with approximately the same amount of force.

Alternatively, if it is desired to form two or more discontinuous hollow sections in the molded part B, the flow of gas through the passageway 6 could be discontinuous or more than one gas injection point into the mold space could be provided.

During the molding cycle, the injection pressure of the molten plastic may fluctuate somewhat. However, the pressure at which the gas is injected through the passageway 6 is relatively constant, since the pump assembly 32 will keep the gas pressure in chamber 28 at substantially the setting dictated by pressure switch 27.

The process of the present invention is more forgiving and is not as hard to run as conventional processes since the volume of the gas going into the gas cavity does not need to be measured but only the pressure needs to be controlled. For the present invention, it is not significant that a greater or smaller volume of gas is injected into the internal cavity 21 than the desired amount. Rather all that is regulated is the pressure of the gas and this is held at approximately a given level. Of course, although the volume of gas entering the mold 11 is not directly measured for each molding cycle, it may be adjusted for a particular mold cycle by adjusting the gas pressure, the plastic injection pressure and the mold design.

The pressure of gas entering the sprue 18 is at least as great as, and preferably greater than, the pressure of the molten plastic entering the sprue. For some plastics the gas pressure may range from 9,000 to 15,000 psi and gas at this high pressure needs to be stored in chamber 28 to insure that the gas is instantaneously available when needed for simultaneous injection with the molten plastic. The end of the gas flow is timed to substantially coincide with the completion of the plastic injection step. Preferably, the gas flow continues to a time just short of the screw ram 13 stopping its forward movement and thus the end of the injection of molten plastic into the mold cavity 11.

When the screw ram 13 finishes its forward movement, the nozzle shutoff valve 16 is closed by hydraulic cylinder actuator 17 preventing communication between the gas pressurized feed chamber 15 and the screw ram 13. Also, the valve 29 is closed. The gas which is trapped in the internal cavity 21, the mold sprue 18, the gas inlet passage 6, and the gas line 22 is held until the valve 30 is opened. However, valve 30 is not opened until the mold 11 has cooled sufficiently to be self-supporting. At such time, the valve 30, which may be a two way directional valve, is activated to the open position by air valve cylinder 24 to vent the pressurized gas from the system and bring the molded part B down to atmospheric pressure. If desired, however, the valve 30 can be a metering valve to control the rate of exhaust.

If desired, a pressure reducing valve 31 can be provided downstream from the valve 30 to allow a drop of the pressure in the internal cavity 21, the sprue 18, the gas inlet passage 6, and the gas line 22 to a desired lower pressure setting. This pressure reducing valve 31 is set to around 1,000 psi thereby reducing the gas pressure in line 22 to that amount. Such pressure is held until the molten plastic in mold 11 has sufficiently cooled to be self-supporting. At such time, gas valve 31 is activated to vent the remaining pressurized gas in line 22 and reduce the pressure in line 22 to atmospheric. At this point, the mold halves 9 and 10 can be separated to permit the removal of the molded part B.

It should be noted that when valve 29 is closed, nozzle shut off valve 16 is closed by the hydraulic cylinder actuator 17. Screw ram 13 can then rotate to accumulate molten plastic 8 for use in the next injection cycle.

Also, during the time period that the molded part is removed, gas pump assembly 32 is activated by pressure switch 27 thereby recharging the gas storage tank 28 until the pressure therewithin reaches the desired setting as indicated on gauge 26. At this point, pressure switch 27 is shut off. The system is then ready for a repeat cycle with valves 16, 29 and 30 in the closed position.

For example, assume that the injection molded part B is such that 160 oz. of plastic would normally have to be used to fill the mold space 11. If it is desired to save 10% of the weight of the resultant part then 16 oz. of plastic would be saved (i.e. only 146 oz. of plastic would be injected). It takes approximately two cubic inches of gas to replace each ounce of plastic and thus 32 cubic inches of gas would be needed. The receiving chamber 28 can be sized so as to be able to provide approximately 20 to 25 cubic inches of pressurized gas. The pump assembly 32 will be activated to supply the remaining required gas to the chamber 28 and the mold space 11. Of course an adequate number of precharged receiving chambers could be provided so that the pump assembly would not need to be activated at all during the injection molding process.

Figure 2:
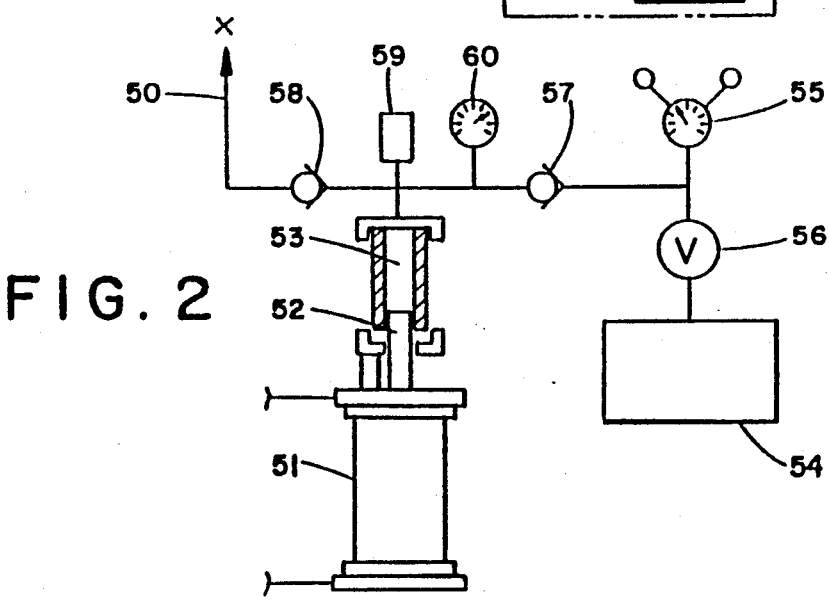

FIG. 2 illustrates an alternative high pressure gas source for use with the mold and screw ram assembly of FIG. 1. The gas source of FIG. 2 is substituted for the gas source shown in FIG. 1 at point X. In other words, disconnect gas line 43 at point X in FIG. 1 and connect gas line 50 of FIG. 2 at this point.

The sequence of operation of the mold and screw ram will remain the same as above described. High pressure gas is, however, stored for injection in cylinder 53 (FIG. 2) with valve 29 being in the closed position. The cylinder or receiving chamber 53 will continue to accumulate gas from a supply tank 54, through a pressure reducing valve 56, until the desired pressure setting, indicated on gauge 55, is reached. A hydraulically operated cylinder 51 is then activated compressing the gas in the cylinder 53 to the desired high pressure, set on pressure switch 59 and indicated on gauge 60, by movement of a piston 52. A check valve 57 prevents gas from returning to the gas supply tank 54. A check valve 58 prevents gas from returning to the cylinder 53. The stored high pressure gas is then instantaneously available for injection into the mold sprue 18 during the molding cycle sequence.

In this embodiment, no recharging of the cylinder 53 takes place during the injection molding process. Rather, a recharging of the cylinder 53 from the gas supply tank 54 takes place only in preparation for the succeeding molding cycle and after the molded part has solidified. For such recharging, the piston 52 is lowered in the cylinder 53 and gas is admitted therein. Once the cylinder is filled with gas from the supply tank 54, the charging of the cylinder 53 takes place due to movement of the piston 52 as urged by the cylinder 51.

A part molding for which the process is particularly applicable is a molding having a large surface area that is supported by thicker areas such as ribs. Gas is injected into the molten plastic stream to extend the plastic along each rib or the like and thereby urge the molded plastic material against all the surfaces of the mold. Generally, the thicker portion of the molded part B contains the internal cavity 21 as shown in FIG. 1.

The invention has been described with reference to preferred and alternate embodiments. Obviously, alterations and modifications will occur to others upon a reading and understanding of this specification. It is intended to include all such modifications and alterations insofar as they come within the scope of the appended claims or the equivalents thereof.

Having thus described the invention, it is now claimed:

1. A process for gas-assisted injection molding, comprising:
    introducing a molten stream of plastic material into a mold space;
    introducing a gas into said mold space thereby forming a gas cavity in the molten material;
    exerting a pressure on the surrounding plastic material, by the gas in said gas cavity, to urge the plastic material toward a surface of said mold space;
    storing a quantity of gas in a storage chamber before the gas is introduced into the mold space;
    replenishing the gas in said storage chamber, said step of replenishing comprising the subsidiary steps of:
    introducing the gas at a relatively low first pressure into a pump,
    increasing the pressure of the gas by utilizing a pump until the gas pressure equals a relatively higher second pressure, and
    introducing the gas at said second pressure into said storage chamber; and,
    venting the gas from said gas cavity at a controlled rate.

2. The process of claim 1 wherein said steps of introducing a molten stream of plastic material and introducing a gas take place simultaneously.

3. The process of claim 1 wherein said steps of introducing a gas and venting the gas take place through a common gas passage.

4. The process of claim 1 further comprising the steps of:
    terminating said step of introducing a molten stream of plastic;
    terminating said step of introducing a gas; and,
    cooling and solidifying the plastic material, wherein all three of said steps of terminating, terminating and cooling take place before said step of venting the gas.

5. The process of claim 1 wherein said step of venting the gas comprises the subsidiary step of metering a flow of the gas from said gas cavity.

6. The process of claim 1 wherein said step of venting the gas comprises the subsidiary step of reducing the pressure of the gas in said gas cavity in a stepped manner.

7. A process for fluid-assisted injection molding, comprising:
    introducing a molten stream of a relatively viscous material into a mold space having an interior surface;
    introducing a relatively non-viscous fluid into the mold space thereby forming a fluid cavity in the molten relatively viscous material, wherein the relatively non-viscous fluid exerts a pressure on the surrounding relatively viscous material to urge the material toward said interior surfaces of the mold space; and,
    venting the relatively non-viscous fluid from said fluid cavity in said mold space in a controlled manner, wherein said step of venting the relatively non-viscous fluid comprises the subsidiary step of reducing the pressure of the relatively non-viscous fluid in said fluid cavity in a stepped manner.

8. The process of claim 7 wherein said step of venting the relatively non-viscous fluid comprises the subsidiary step of metering a flow of the relatively non-viscous fluid from said fluid cavity.

9. The process of claim 7 wherein said steps of introducing the relatively viscous fluid and the relatively non-viscous fluid to said mold space and venting the relatively non-viscous fluid from said mold space are accomplished through a nozzle.

10. The process of claim 7 wherein said step of introducing the relatively viscous material is terminated before all of a volume of said mold space is filled with the relatively viscous material.

11. The process of claim 7 further comprising the steps of:
    terminating said step of introducing the relatively viscous material; and,
    terminating said step of introducing the relatively non-viscous material, both of said steps of terminating taking place before said step of venting.

12. The process of claim 11 wherein said step of terminating the supply of the relatively non-viscous fluid takes place when said interior surfaces of said mold space are completely covered by the molten relatively viscous material.

13. The process of claim 7 wherein said step of venting comprises the subsidiary steps of:
    reducing a pressure within said fluid cavity from a first pressure to a second, and lower, pressure;
    maintaining said second pressure in said gas cavity until the relatively viscous material has cooled and solidified; and,
    reducing the pressure within said fluid cavity to atmospheric pressure.

14. A process for producing an injection molded product, comprising:
    injecting an amount of a molten thermoplastic material sufficient for the preparation of the product into a mold space having interior surfaces;
    introducing a pressurized fluid into the mold space to expand and distribute the molten thermoplastic material over the interior surfaces of the mold space thereby forming a fluid cavity in the molten thermoplastic material;
    cooling a hollow shaped body so formed to a temperature below a softening point of the thermoplastic material thereby allowing the product to take its final shape; and,
    venting the fluid from the fluid cavity in a controlled manner wherein said step of venting comprises the subsidiary steps of:
    reducing a pressure within said fluid cavity from a first pressure to a second, and lower, pressure,
    maintaining said second pressure in said gas cavity until the relatively viscous material has cooled and solidified, and
    reducing the pressure within said fluid cavity to atmospheric pressure.

15. The process of claim 14 wherein said steps of introducing a pressurized fluid and venting the fluid are accomplished through a common fluid passage.

16. The process of claim 14 wherein said fluid is a neutral gas.

17. The process of claim 14 wherein said step of venting the fluid comprises the subsidiary step of metering a flow of the fluid from the fluid cavity.

18. The process of claim 14 wherein said step of venting the fluid comprises the subsidiary step of reducing the pressure of the fluid in the fluid cavity in a stepped manner.

* * * * *